United States Patent [19]

Heard

[11] Patent Number: 5,000,284

[45] Date of Patent: Mar. 19, 1991

[54] METHOD AND APPARATUS FOR RECORDING DRIVING CHARACTERISTICS AND IMPROVING SAFETY CONTROL OF AUTOMOTIVE VEHICLES

[76] Inventor: Edward C. Heard, c/o Garate Enterprises, Inc., 855 Marietta Way, Sparks, Nev. 89431

[21] Appl. No.: 458,473

[22] Filed: Dec. 28, 1989

Related U.S. Application Data

[63] Continuation-in-part of Ser. No. 790,133, Oct. 22, 1985, abandoned.

[51] Int. Cl.⁵ .............................................. B60K 28/12
[52] U.S. Cl. ..................................... 180/282; 280/758
[58] Field of Search ......................... 280/758; 180/282

[56] References Cited

U.S. PATENT DOCUMENTS

| | | | |
|---|---|---|---|
| 2,990,193 | 6/1961 | Heard | 280/758 |
| 3,497,236 | 2/1970 | Schell | 280/758 |
| 3,501,166 | 3/1970 | George | 280/758 |
| 3,523,696 | 8/1970 | Holcombe | 280/758 |
| 3,614,126 | 10/1971 | Carlson | 280/758 |
| 4,528,547 | 7/1985 | Rodney | 180/282 |

*Primary Examiner*—Kenneth R. Rice
*Attorney, Agent, or Firm*—Sughrue, Mion, Zinn, Macpeak & Seas

[57] ABSTRACT

This invention is a method and apparatus for use with automotive vehicles wherein a weight is mounted appropriately toward the rear of the vehicle, which weight has the ability to shift slightly to the right or to the left of the vehicle under forces such as turning at high speed, or the like, in order to add to the control of the vehicle by the driver and wherein the weight therein returns to a centered position with reference to the center line of the vehicle after the unusual stress is relieved, and wherein the driving characteristics of the driver are reported as a result of unusual physical stresses placed upon the vehicle.

9 Claims, 4 Drawing Sheets

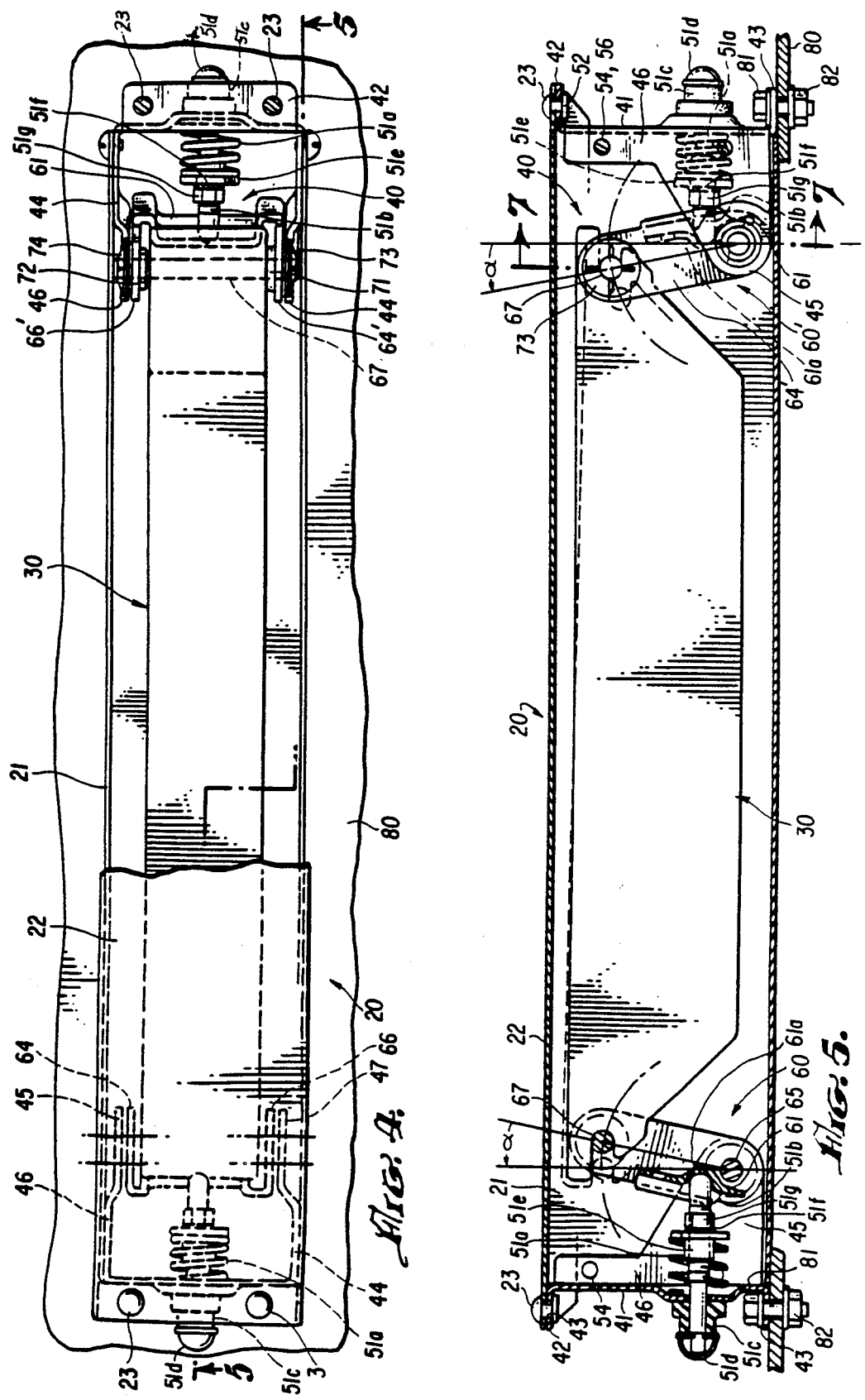

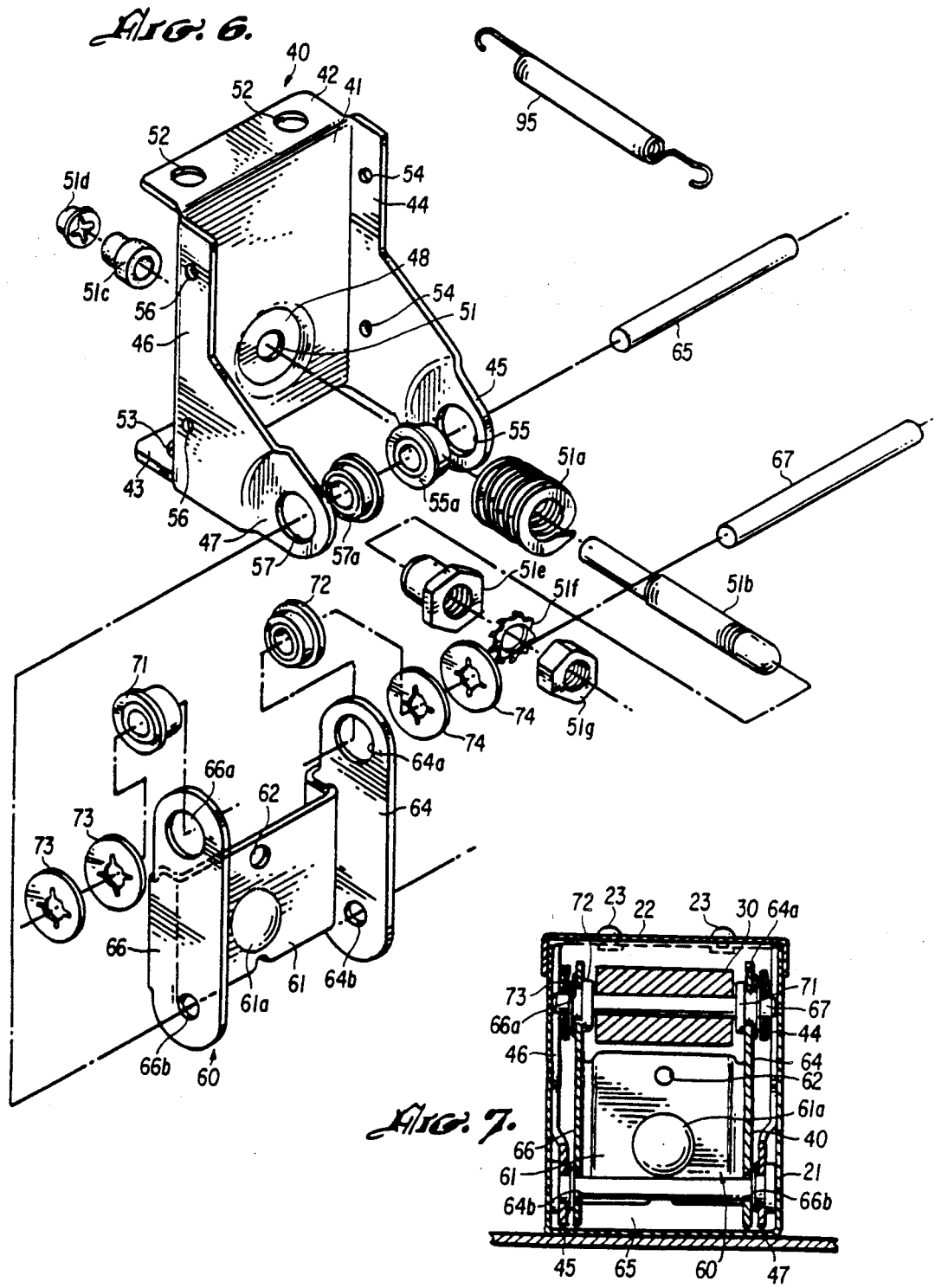

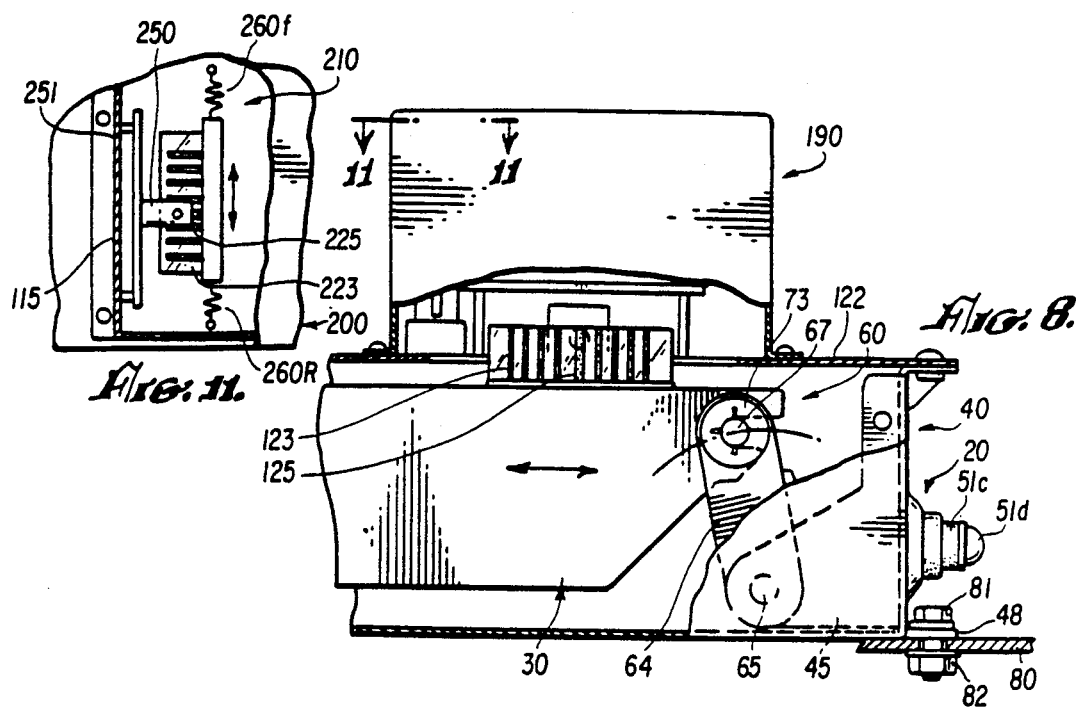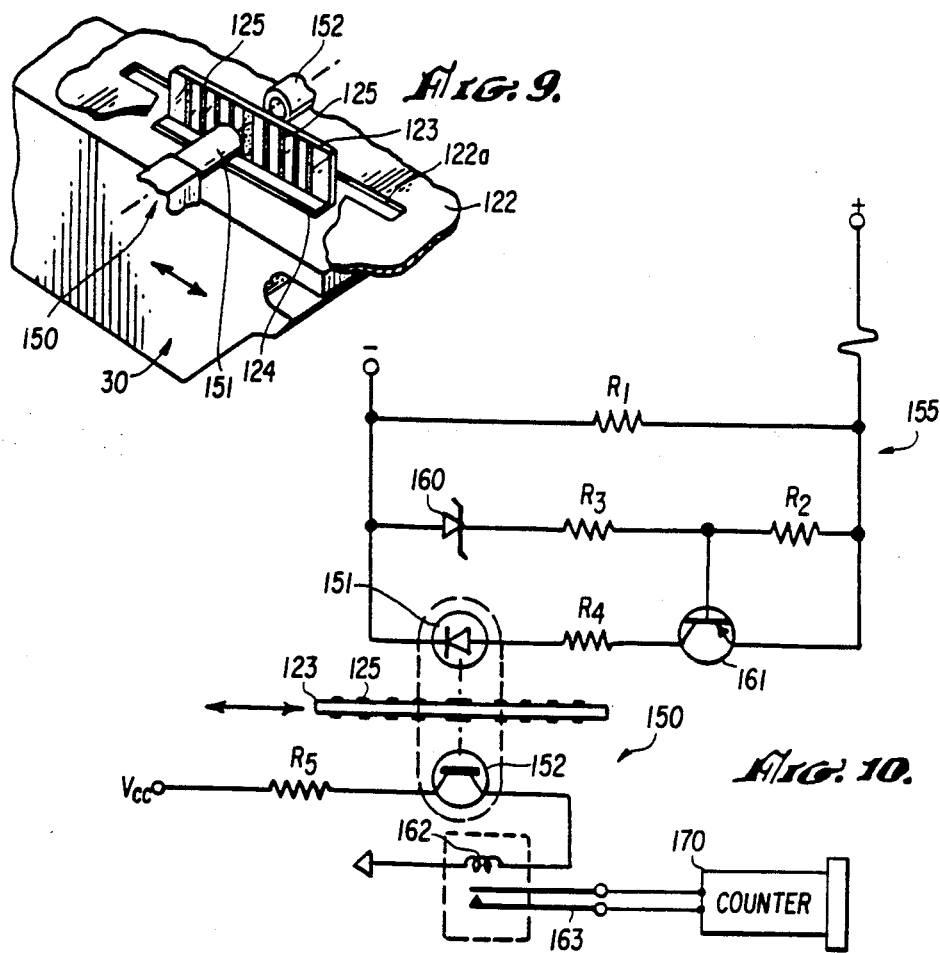

METHOD AND APPARATUS FOR RECORDING DRIVING CHARACTERISTICS AND IMPROVING SAFETY CONTROL OF AUTOMOTIVE VEHICLES

CROSS REFERENCE TO RELATED PATENT APPLICATIONS

This is a continuation-in-part of application Ser. No. 06/790,133, filed on Oct. 22, 1985.

BACKGROUND OF THE INVENTION

I. Field of the Invention

This invention is in the general field of methods and apparatus for improving safety and control in the driving of automotive vehicles and reporting driver characteristics; the invention is more particularly directed to a method and apparatus to aid in the control of a moving automotive vehicle and reporting stresses involved; the method and apparatus is even more directly in the field of a method and apparatus comprising the utilization of a weighted device in conjunction with the automotive vehicle which weighted device swings slightly from side to side depending upon the forces on the vehicle in turns, and the like, for purposes of controlling steering and return to normal after heavy forces are applied in one direction or the other to the rear of the vehicle and in recording unusual stresses forward, backward, and side to side.

II. Description of the Prior Art

The method and apparatus herein are related to, but different from my U.S. Pat. No. 2,990,193 on Automobile Stabilizers.

SUMMARY OF THE INVENTION

There are a large number of unusual force conditions during driving which can cause the driver of an automotive vehicle to lose control and be unable to properly control the vehicle. Some examples are the locking of the wheels in an emergency or panic stopping situation; the blow out of a tire: slippery or icy conditions on the road; loose material such as sand or gravel on an otherwise hard surface; excessive speed in a road curve: a wheel or wheels running off of the edge of a paved road: a curb which is encountered by a wheel. Many of these conditions are caused by the driver of the vehicle.

Under any of the above named conditions and many other conditions which will be known to those skilled in the art, the driver will generally lose partially, or wholly, the ability to properly control the vehicle.

I have studied this for a number of years and have previously made the invention described in U.S. Pat. No. 2.990,193. While the invention of U.S. Pat. No. 2,990,193 was a great improvement over anything theretofore existing. I have now conceived and developed a new and improved safety control weighting method and apparatus for automotive vehicles in order to control the vehicle from going into a severe skid or the like.

I have also incorporated into this method and apparatus, a method for recording information as to movement of the vehicle under stress, in order to have a record which can be interpreted to give an indication of the driving habits of the driver. By this recording arrangement, the number of severe stress events encountered will be clearly revealed and thus give an indication of the general driving habits and safety of the particular driver.

Additionally, where a vehicle has taken to weaving back and forth (such as a drinking, drugged, or sloppy driver) so as to be a menace on the highway, the device can be so configured as to sense such condition and sound an alarm or give other signal or indication of potential danger on the road.

Ideally, the device which is hereinafter described in detail in the description of a preferred embodiment will be mounted near the rear of the vehicle. In any event the device and its alternate embodiments should be located in the vehicle so as to provide the best aid and information. Generally speaking the farther to the rear of the vehicle the apparatus is mounted, the more control and information will be provided.

In use, the weight, which comprises a basic functioning element, (although there are other functioning elements) will have a tendency to move (and thus provide stability) in the direction opposite from that of a natural skid or the like. This will be understood by reading the description of a preferred embodiment which follows.

It is an object of this invention to provide a method and apparatus for assisting in the steering control of an automotive vehicle under severe side to side force conditions.

Another object of this invention is to provide such a method and apparatus as is herein described which can be mounted within a vehicle without unduly interfering with the carrying capacity of the vehicle.

Another object of this invention is to provide such a method and device as has been described wherein the weighted element will return to its normal position automatically upon relief from the sideways thrust.

Another object of this invention is to provide a method and apparatus to disclose and record individual driving characteristics, particularly vehicle stress situations.

Another object of this invention is to provide a means to give warning concerning operation of a vehicle by an impaired driver.

The foregoing and other objects and advantages of this invention will become apparent to those skilled in the art upon reading the description of a preferred embodiment, which follows, in conjunction with the appended drawings.

BRIEF DESCRIPTION OF THE DRAWINGS

FIG. 4 is a top plan view of a preferred apparatus to practice this invention with the top cover partially broken away and with certain elements shown in phantom;

FIG. 5 is a partially sectionalized view of 5—5 of FIG. 4;

FIG. 6 is an exploded view of one of the end mounting elements utilized in the apparatus shown in FIGS. 3, 4, and 5;

FIG. 7 is a sectionalized view on 7—7 of FIG. 5;

FIG. 8 is a partially sectioned view of a broken away portion of the right end of FIG. 5 with a recording device added to the top FIG. 9 is a broken away, partially sectioned view of the movement sensing device shown in FIG. 8;

FIG. 10 is a partial schematic view of circuitry for the movement sensing and recording device of FIG. 8 and 9; and FIG. 11 is a schematic top elevational view of a device to record stress starting and stopping conditions.

DESCRIPTION OF A PREFERRED EMBODIMENT

Figure 1:
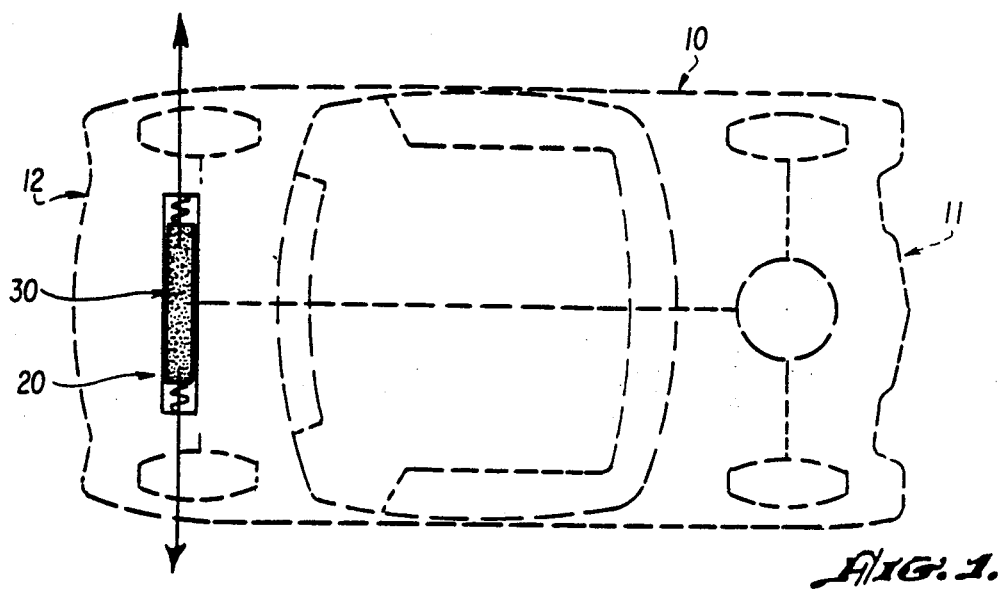
FIG. 1 is a schematic top plan view in phantom of an automotive vehicle showing a preferred apparatus to practice the method of this invention mounted within the vehicle.
Figure 2:
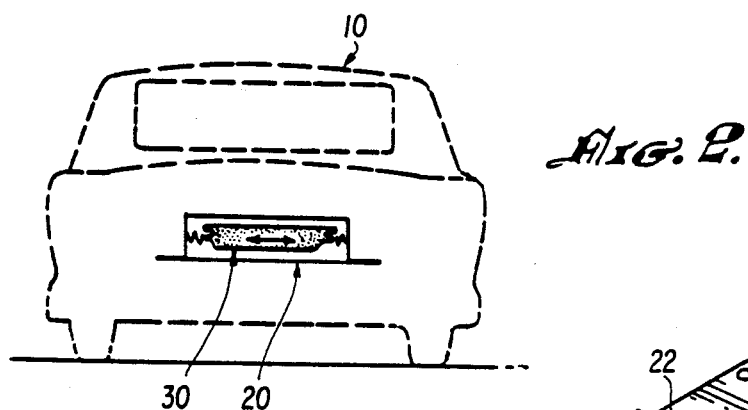
FIG. 2 is a rear elevation of the vehicle of FIG. 1.

FIG. 1 and 2 illustrate in phantom and schematically an automobile generally 10 having a front 11 and rear 12. A preferred embodiment of this invention generally 20 is mounted in the trunk area of the vehicle as shown. The apparatus includes as an important feature a weight 30.

Figure 3:
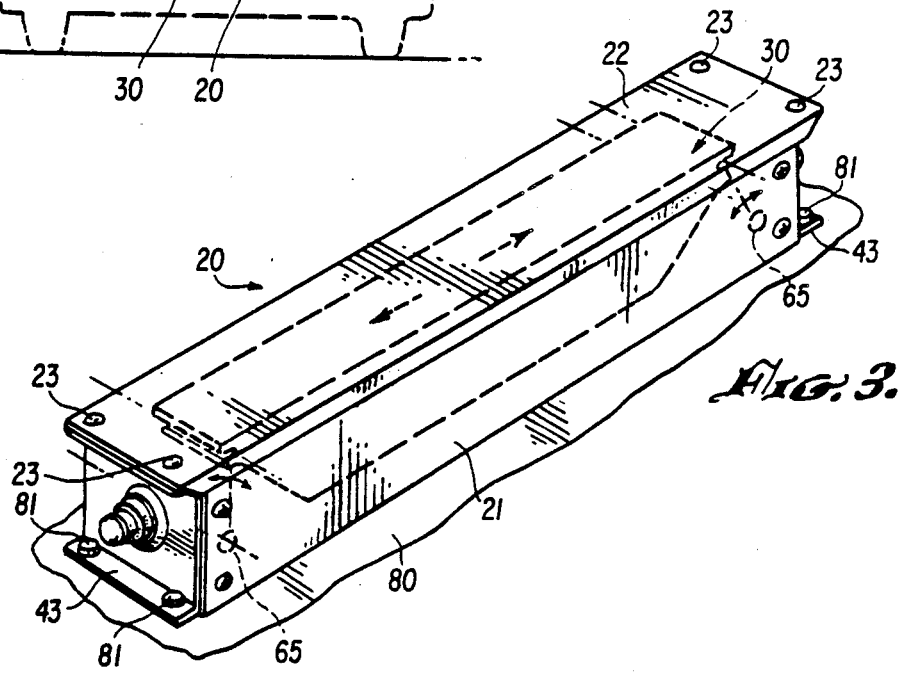
FIG. 3 is a perspective of a preferred embodiment of the apparatus to practice the method of this invention shown partially in phantom.

With attention directed to FIG. 3, certain of the elements comprising the invention are shown. The broken away base 80 is the floor of the trunk of the vehicle or another suitable location in the rear of the vehicle and being a part of the vehicle. The device 20 is fastened to this base 80 by a number of bolts or the like 81 in a manner known to those skilled in the art.

The weight 30 is shown in phantom within the general item 20. The top of the case of the item 20 is shown to be fastened by rivets or the like 23. The elements 65 are axles upon which the mechanism can move slightly in the direction of the arrows shown in phantom in connection with the weight 30. As will be observed in subsequent figures, the weight actually moves through a slight arc in its movement.

The remaining numbered items in FIG. 3 are the flanges 43 which are used for the fastening by the bolts 81.

FIG. 4 is a partially broken away top elevational view showing a number of items of importance. The device is shown once again fastened to its base 80. It is shown to have a complete shell, or casing 21 basically in the form of a U-shaped member with two ends 41 each of which has flanges 42 and 43. Flanges 43, of course, are used to mount to the base member 80 by bolts 81 and nuts 32. The top 20 is riveted to flanges 42 at 23 or may be fastened with bolts if desired. Each end 41 carries a spring loaded rod member 51a-51b-51c-51d-51e-51f and 51g which will be understood by those skilled in the art. The rod presses as indicated against a respective carrier device 60 at each end. The weight 30 is pivotally mounted on a pair of carrier devices or mountings 60, wherein a single carrier device is provided at each end of the weight. The carrier devices, of course, allow the motion of the weight 30 as will be hereafter described. The spring 51a restricts the amount of movement and establishes a torque level that is necessary to overcome in order for the weight 30 to move. The spring, of course, is mounted to the rod 51b as shown with the collar and locking arrangement 51e, f and g. The end of the rod is locked by retainer 51c and d as will be understood by those skilled in the art.

The spring loaded rod assembly as previously mentioned fits within the end plate at the opening 51 and the other end is received by and presses against the socket 61a in the weight mounting unit or carrier generally at 60.

The two axles 65 and 67 are mounted on the carriers 60 as indicated and mounted into the end units as shown. The end units have certain elements which will be described in further detail in connection with exploded view FIG. 6 and in connection with FIG. 7.

Each carrier device is a pivotable link including a pair of spaced apart arms 64 and 66 rigidly connected together by a plate member 61. As best seen in FIG. 5, the arms 64. 66 of the left-hand carrier device 60 and the arms 64. 66 of the right-hand carrier device 60 incline towards each other and away from the vertical when the weight 30 is in its neutral position. This is accomplished by spacing the lower axles 65 farther apart than the upper axles 67 which are fitted in corresponding slots in weight 30. Under these conditions, if there is a swing of the rear of the vehicle to the left, the left side arms 64. 66 will pivot counterclockwise about axle 65. This in turn causes the left side arms to move towards the vertical position which corresponds to the maximum height of the left end of the weight 30. At the same time, the right side arms 64. 66 must pivot in the same counterclockwise direction. However, since the upper portion of the right side arms is disposed to the left of its vertical position when the weight 30 is in its neutral position, the right end of the weight 30 moves downwardly. Accordingly, the weight 30 is tilted during a shift from the neutral position either leftward or rightward (see phantom lines in FIG. 5).

The angle of incline $\alpha$ of each of the carrier devices 60 with respect to the vertical may be set in the range of $5°--15°$, with $9°-13°$ being preferred.

When mounted in the manner shown, if sufficient force is exerted by the weight 30 to either the right or the left, the weight will move through an arc as indicated in that direction.

With attention directed particularly to FIGS. 6 and 7, the end mounting apparatus and the spring loaded rod are shown in complete detail. The flanges 42 and 43 have holes 52 and 53 mounting the top of the unit and for mounting the unit to the vehicle. The entire unit generally 40 consists of those flanges previously mentioned, end plate 41, sides 46 and 44 with holes 54, 55, 56 and 57 as indicated for mounting the various elements which are clear. The rod 51b mounts within the spring 51a and is held by nuts 51e and 51g with lock washer 51f. The rod has a threaded portion as indicated.

At the other end when mounted in the apparatus the rod extends through the opening 51 and the spring 51a presses against the reinforced portion 48. The rod is held by the bushing 51c and the lock nut retainer 51d. Axle 65 mounts through holes 55 and 54 and within bushings 55a and 51a and further passes through holes 64b and 66b in a lower portion of arms 64 and 66, respectively. Axle 65 carries the weight carrier element 60 by insertion in holes 64b and 66b. The socket arrangement 61a in member 61 is for contact with end of rod 51b. Axle 67, which actually mounts the weight, is mounted as indicated through holes 64a and 66a in an upper portion of arms 64 and 66, respectively, with mounting and retainer elements 74 and 73. Weight 30 is then carried as shown particularly well in FIG. 7 and in FIG. 5.

Spring element 95 is an auxiliary item utilized for assembling the item. The spring 95 hooks into the hole 62 which is provided for this purpose and over the end of the flange 42 in order to hold the carrier 60 while being mounted. The reason for this is to overcome the pressure exerted by spring 51a. After mounting the spring 95 is removed.

In the operation of the device as has been illustrated in FIGS. 1 through 7, when a vehicle makes a sudden turn or goes into a skid, the weight tends to move in a direction opposite to the direction of the rear of the vehicle, thus stabilizing.

I have found that most vehicles will be well controlled by a 41½ pound weight. To some extent then, a weight in the neighborhood of 41½ pounds is quite desirable and will give the most energy and the quickest response.

The effect of this control is useful under numerous circumstances, not only in skids or high speed turns, but frequently there will be other conditions which will cause a vehicle to have a sudden sideways movement and controlling the rear of the vehicle is very beneficial. For example, if a wheel should drop off of the pavement, if there should be a blowout, if a sudden oil slick or the like should be encountered, the control would be very effective and would help maintain control of the vehicle.

In connection with this control apparatus certain very important readings and other advantages may be obtained. FIGS. 8 through 11 show schematically how this can be accomplished.

In FIG. 8 a different cover 122 has been substituted for the cover 22. This cover has a slot as indicated at 191 which is covered by a casing 190 carrying certain electrical or electronic elements. The casing also incorporates an electric eye or other reading apparatus such as a bar reader. An apparatus 123 carrying a series of bar indicators 125 or the like can be mounted to the top of the weight 30 by a mounting flange 24 or other suitable mounting arrangement. Mounted to the case 190 will be an electric eye or other reading apparatus 150-151-152. Thus, when the weight 30 shifts, the bar carrying apparatus 123 will shift with it and move in that slot 122a. Thus, the number of times and the magnitude overall of movement of the weight 30 will be recorded.

By utilizing this system of recording, the driving characteristics of the different drives can be monitored. The best driving record will be that which shows the least number of marks and thus the least movement of the weight 30. This of course indicates that a driver has been making safe and proper movements. With a high number of marks recorded they would indicate the driver was taking too many fast or unsafe curves or for some other reason was having difficulty with the vehicle.

FIG. 10 shows a circuit arrangement for counting the number of times the weight has moved through the recording circuitry at 150 and will indicate the count or the like by means of a counter 170.

As best seen in FIG. 10, the light emitting circuit 155 includes a voltage source, a zener diode 160, resistors $R_1$ through $R_4$, a transistor 161, and a light emitting diode 151 which is enabled when the transistor 161 is turned on. The counting circuitry 150 includes a light receiving element 152, a voltage source $V_{cc}$, a resistor $R_5$, a coil 162, a switch 163 and a counter 170.

When the weight 30 shifts and the light from LED is allowed to pass between the bar indicators 125, the light receiving element 152 in turn permits current to pass from the voltage source $V_{cc}$ to thereby energize a coil 162. Upon energization of the coil 162, the switch 163 is closed and the counter records one count.

A number of circuitries for this recording are well known in the electronic arts and include such devices as are used commonly to count passage of people through an electric eye reading arrangement or the like. Therefore further details are not required.

In addition to this type of arrangement, it is possible to also record forward and backward motion of an auxiliary device. A heavy weight is not of value in connection with panic stops or fast starts. However a small weight as indicated in FIG. 11 can be mounted between a pair of springs and a couple of mounting brackets on a frame as at 115. 215, with a reading device similar to that shown in FIG. 9 at 250. The springs 260r and 260f are respectively towards the rear and towards the front of the vehicle. Thus in a panic stop the item will tend to move forward and the bars will be counted. The same will hold true on a very fast start but in reverse wherein the weight will move backwards in the direction of spring 260r. Thus similar counting of the performance of the driver and recording a driver who makes many panic stops or excessively fast starts can be detected.

Other uses can be made of the device. particularly as shown in FIGS. 8 and 9. These uses will include the potential of detecting impaired drivers (impaired by reason of drugs or alcohol, by reasons of drowsiness, and other conditions). An impaired driver can be detected since most impaired drivers will have a tendency to weave on the roadway and thus a rhythmical weaving will be recorded by a rhythmical back and forth movement of the bar device 123. This can even be arranged electronically by means known to those skilled in the electronic arts so that the signal at 170 of the diagram FIG. 10 would activate a horn or other alarm so as to alert anyone who could hear it or see it to a dangerous condition of a driver.

It will be observed that numerous other dangerous activities could be detected and suitable warning or other activity commenced.

Examples of this invention are described below together with comparison examples.

EXAMPLE 1

In the first example. a device as set forth above was used with a weight of 41½ lbs. and having an angle $\alpha = 9°$ (i.e., the angle of incline inwardly with respect to a vertical position of each carrier device 60).

The weight was then pushed to the right as far as possible and released rapidly. As a result, the entire unit jumped to the left from a predetermined line designated as the zero base line. After 20 test runs, the unit of Example 1 jumped to the left 2¼ inches consistently.

COMPARISON EXAMPLE 1

The weight of the device of U.S. Pat. No. 2,990,193 was pushed to the right as far as possible and then released very rapidly. After 20 test runs, the 193 unit jumped ¾ of an inch to the left.

EXAMPLE 2

The unit of the present invention as described in Example 1 was again employed. However, the unit was placed against a solid base or bumper weighing 5 lbs. in order to determine how much energy was going to the right at the time of the release of the weight. After 20 test runs, the unit of Example 2 would displace the bumper 3 inches from the zero base line.

COMPARISON EXAMPLE 2

A unit as described in Comparison Example 1 was likewise placed against a solid base weighing 5 lbs. and the weight was released. After 20 test runs, the 193 unit would displace the bumper 1½ inches from the zero base line.

EXAMPLE 3

A board was nailed to the test table, and the right end of the unit of the present invention as described in Example 1 was placed solidly against the board. The weight was pushed by hand to the right as far as possible and then sharply released to the left. With the energy of the unit being prevented from going to the right, the energy was forced to the left (this is analogous to the amount of energy release 180° out of phase with a vehicle). After 20 test runs, the unit of Example 3 consistently jumped 4¼ inches away from the board.

COMPARISON EXAMPLE 3

The same test was carried out as described above in Example 3 except that the 193 unit was employed. After 20 test runs, the 193 unit jumped away from the board an average of 2¼ inches.

Thus, it is apparent from the above test results that the device of the present invention exhibited a remarkable increase in potential and kinetic energy when compared to the device of U.S. Pat. No. 2,990,193. Further, the recovery time (i.e., the time required for the weight to return to the neutral position) was about 2½ times faster than that of the 193 device.

While the embodiments of this invention shown and described are fully capable of achieving the objects and advantages desired, it is to be understood that such embodiments are for purposes of illustration only and not for purposes of limitation.

What is claimed is:

1. An apparatus for aiding in control of an automotive vehicle in motion, said apparatus comprising:
   a movable weight;
   means for transversely mounting said weight, said mounting means being fixedly secured to the rear of the transverse centerline of said automotive vehicle, said weight being arranged with its center along the longitudinal center line of said automotive vehicle;
   said mounting means including means for causing said weight to move from one side of the longitudinal center line of said automotive vehicle to the other side thereof when said automotive vehicle is under stress, with one end of said weight moving in a circular arc in an upward direction and the other end of said weight moving in a circular arc in a downward direction such that said weight is tilted with respect to a horizontal position; and
   further comprising an indicating means which acts cooperatively with said weight so as to indicate and record movement of said weight, wherein said indicating means comprises a member mounted on a top surface of said weight and carrying a series of bar indicators, and a bar reader mounted to a top portion of a casing which encloses said weight.

2. The apparatus of claim 1, wherein the mounting means comprises two pivotally mounted weight carrier devices, the first one of which is mounted at a distance to the right of the longitudinal center line of the automotive vehicle and the second of which is located an equal distance to the left of the longitudinal center line of the vehicle, said carrier devices being inclined towards each other and away from a vertical position when said weight is in a neutral, unstressed position, and in which each of said carrier devices will move in an arc as the weight moves.

3. The apparatus of claim 1 in which the said indicating means is connected to an alarm means so as to sound an alarm upon a predetermined number of movements having been made.

4. The apparatus of claim 1, wherein a secondary weight is mounted in cooperative relationship with the first weight and wherein said secondary weight is mounted so as to allow movement of said secondary weight in a longitudinal direction and wherein said secondary weight is associated with indicating means which indicates and records the movement of said secondary weight.

5. The apparatus of claim 2, wherein each of said carrier devices is inwardly inclined with respect to said vertical position at an angle in a range of 5° to 15°.

6. The apparatus of claim 5, wherein said range of angles is 9° to 13°.

7. The apparatus of claim 2, wherein the weight is restrained by compression spring means against movement and in which said compression spring means can be adjusted so that under sufficient pressure the weight will move against the compression spring means.

8. The apparatus of claim 2, wherein the weight weighs 41½ pounds.

9. An apparatus for aiding in control of an automotive vehicle in motion, said apparatus comprising:
   a movable weight;
   means for transversely mounting said weight, said mounting means being fixedly secured to the rear of the transverse centerline of said automotive vehicle, said weight being arranged with its center line along the longitudinal center line of said automotive vehicle;
   said mounting means including means for causing said weight to move from one side of the longitudinal center line of said automotive vehicle to the other side thereof when said automotive vehicle is under stress, with one end of said weight moving in a circular arc in an upward direction and the other end of said weight moving in a circular arc in a downward direction such that said weight is tilted with respect to a horizontal position, wherein the mounting means comprises two pivotally mounted weight carrier devices, the first one of which is mounted at a distance to the right of the longitudinal center line of the automotive vehicle and the second of which is located an equal distance to the left of the longitudinal center line of the vehicle, said carrier devices being inclined towards each other and away from a vertical position when said weight is in a neutral, unstressed position, and in which each of said carrier device will move in an arc as the weight moves, wherein the weight is restrained by compression spring means against movement and in which said compression spring means can be adjusted so that under sufficient pressure the weight will move against the compression spring means; and
   further comprising an indicating means which acts cooperatively with said weight so as to indicate and record movement of said weight, wherein said indicating means comprises a member mounted on a top surface of said weight and carrying a series of bar indicators, and a bar reader mounted to a top portion of a casting which encloses said weight.

* * * * *